US011082620B2

(12) United States Patent
Dwarakanath et al.

(10) Patent No.: US 11,082,620 B2
(45) Date of Patent: Aug. 3, 2021

(54) ZOOMED IN REGION OF INTEREST

(71) Applicant: QUALCOMM Incorporated, San Diego, CA (US)

(72) Inventors: Sundararam Dwarakanath, San Diego, CA (US); Kranthi Kumar Boggarapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/142,778

(22) Filed: Sep. 26, 2018

(65) Prior Publication Data

US 2020/0099866 A1   Mar. 26, 2020

(51) Int. Cl.
H04N 5/232   (2006.01)
(52) U.S. Cl.
CPC .............................. H04N 5/232935 (2018.08)
(58) Field of Classification Search
CPC .................... H04N 5/232935; H04N 5/23296
See application file for complete search history.

(56) References Cited

U.S. PATENT DOCUMENTS

| 8,780,251 B2 | 7/2014 | Imai |
| 9,131,143 B2 | 9/2015 | Glennie et al. |
| 9,635,246 B2 | 4/2017 | Shroff et al. |
| 2005/0128333 A1 | 6/2005 | Park et al. |
| 2012/0327269 A1* | 12/2012 | Hwang ............... H04N 5/23219 348/234 |
| 2017/0125064 A1 | 5/2017 | Aggarwal et al. |

FOREIGN PATENT DOCUMENTS

| EP | 1670253 A1 | 6/2006 |
| EP | 2207342 A2 | 7/2010 |
| EP | 2574040 A2 | 3/2013 |
| WO | WO-2017096220 A1 | 6/2017 |
| WO | WO-2017180050 A1 | 10/2017 |

OTHER PUBLICATIONS

International Search Report and Written Opinion—PCT/US2019/049214—ISA/EPO—dated Nov. 21, 2019.

* cited by examiner

Primary Examiner — Antoinette T Spinks
(74) Attorney, Agent, or Firm — Pamela K. Soggu

(57) ABSTRACT

An example device may include one or more processors, a display, and a memory. The memory may include instructions that, when executed by the one or more processors, cause the device to receive a preview stream of a scene from a camera, present the preview stream on the display, enlarge a first region of interest (ROI) of the scene presented on the display, receive directional input from a user indicating a second ROI of the scene, wherein at least a portion of the second ROI is not currently presented on the display with the enlarged first ROI, transition from the enlarged first ROI to an enlarged portion of the second ROI based on the received directional input without adjusting a zoom level of the camera, and present the enlarged portion of the second ROI on the display.

26 Claims, 7 Drawing Sheets

ZOOMED IN REGION OF INTEREST

TECHNICAL FIELD

This disclosure relates generally to digital cameras, and specifically to systems and methods for zooming or enlarging a selected region of interest of a preview stream presented on a display of a device.

BACKGROUND

A digital camera may present a preview stream of a scene on a display for viewing by a user. When the digital camera is zoomed in on a selected region of interest (ROI) of the preview stream, the user may not be able to move the zoomed ROI to another part of the preview stream without exiting the camera from zoom mode, re-positioning the camera so that another ROI is centered in the camera's field of view (FOV), and then zooming in on the other ROI. As a result, if the user wants to select another ROI of the preview stream for zooming, the camera zooms out of the selected ROI so that the camera's entire FOV can again be displayed as the preview stream to the user. The user may select another ROI of the preview stream for zooming by panning the camera until the other ROI is centered in the camera's FOV, and the camera may once again zoom-in on the center portion of the camera's FOV to enlarge the other ROI selected by the user. Alternatively, the user may be required to physically move or pan the camera while zoomed in to display other portions of the scene while zoomed in.

There is a need for a camera that may allow a user to zoom in on a first ROI of a preview stream and thereafter move the zoomed portion to a second ROI of the preview stream without zooming out to view the entire FOV of the camera again.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for operating a system such as a mobile device. In some implementations, the method can include receiving a preview stream of a scene from a camera, presenting the preview stream on a display of the system, enlarging a first region of interest (ROI) of the scene presented on the display, receiving directional input from a user indicating a second ROI of the scene (such that at least a portion of the second ROI is not currently presented on the display with the enlarged first ROI), transitioning from the enlarged first ROI to an enlarged portion of the second ROI based on the received directional input without adjusting a zoom level of the camera, and presenting the enlarged portion of the second ROI on the display. The enlarged first ROI can be presented on the display without adjusting the zoom level of the camera, and the enlarged portion of the second ROI can be presented on the display without adjusting the zoom level of the camera. In some implementations, the first ROI can be enlarged by digitally cropping a first frame of the preview stream, and the enlarged portion of the second ROI can be presented on the display by digitally cropping a second frame of the preview stream. In some aspects, the first ROI can be enlarged by digitally cropping the first frame using a first asymmetrical cropping ratio, and the enlarged portion of the second ROI can be presented on the display by digitally cropping the second frame using a second asymmetrical cropping ratio that may be different from the first asymmetrical cropping ratio.

In some implementations, the display can be a touch-sensitive display, and the system can receive directional input from the user by presenting a number of directional indicators on the display, and detecting user interaction with one of the directional indicators. In other implementations, the directional input can be user input (such as one of a swiping input or gesture, a flicking input or gesture, or a dragging input or gesture). In some implementations, the method can include determining camera settings based on one or more buffered frames of the preview stream, wherein presenting the enlarged portion of the second ROI on the display is based, at least in part, on the determined camera settings. In addition, or in the alternative, the method can include adjusting a size of the enlarged portion of the second ROI based on one or more user inputs. In some aspects, the one or more user inputs can include at least one of a pinching gesture or a stretching gesture.

Another innovative aspect of the subject matter described in this disclosure can be implemented in a device. The device can include at least a display, one or more processors, and a memory. The memory can store instructions that, when executed by the one or more processors, cause the device to receive a preview stream of a scene from a camera, to present the preview stream on the display of the device, to enlarge a first region of interest (ROI) of the scene presented on the display, to receive directional input from a user indicating a second ROI of the scene (such that at least a portion of the second ROI is not currently presented on the display with the enlarged first ROI), to transition from the enlarged first ROI to an enlarged portion of the second ROI based on the received directional input without adjusting a zoom level of the camera, and to present the enlarged portion of the second ROI on the display. The enlarged first ROI can be presented on the display without adjusting the zoom level of the camera, and the enlarged portion of the second ROI can be presented on the display without adjusting the zoom level of the camera. In some implementations, the first ROI can be enlarged by digitally cropping a first frame of the preview stream, and the enlarged portion of the second ROI can be presented on the display by digitally cropping a second frame of the preview stream. In some aspects, the first ROI can be enlarged by digitally cropping the first frame using a first asymmetrical cropping ratio, and the enlarged portion of the second ROI can be presented on the display by digitally cropping the second frame using a second asymmetrical cropping ratio that may be different from the first asymmetrical cropping ratio.

In some implementations, the display can be a touch-sensitive display, and the device can receive directional input from the user by presenting a number of directional indicators on the display, and detecting user interaction with one of the directional indicators. In other implementations, the directional input can be user input (such as one of a swiping input or gesture, a flicking input or gesture, or a dragging input or gesture). In some implementations, execution of the instructions can cause the device to determine camera settings based on one or more buffered frames of the preview stream, wherein presenting the enlarged portion of the second ROI on the display is based, at least in part, on the determined camera settings. In addition, or in the alternative, execution of the instructions can cause the device to adjust a size of the enlarged portion of the second ROI based on one or more user inputs. In some aspects, the one or more user inputs can include at least one of a pinching gesture or a stretching gesture.

Another innovative aspect of the subject matter described in this disclosure can be implemented in a non-transitory computer-readable medium. The non-transitory computer-readable medium can store one or more programs containing instructions that, when executed by one or more processors of an apparatus, cause the apparatus to perform a number of operations. In some implementations, the number of operations can include receiving a preview stream of a scene from a camera, presenting the preview stream on a display of the apparatus, enlarging a first region of interest (ROI) of the scene presented on the display, receiving directional input from a user indicating a second ROI of the scene (such that at least a portion of the second ROI is not currently presented on the display with the enlarged first ROI), transitioning from the enlarged first ROI to an enlarged portion of the second ROI based on the received directional input without adjusting a zoom level of the camera, and presenting the portion of the second ROI on the display. The enlarged first ROI can be presented on the display without adjusting the zoom level of the camera, and the enlarged portion of the second ROI can be presented on the display without adjusting the zoom level of the camera. In some implementations, the first ROI can be enlarged by digitally cropping a first frame of the preview stream, and the enlarged portion of the second ROI can be presented on the display by digitally cropping a second frame of the preview stream. In some aspects, the first ROI can be enlarged by digitally cropping the first frame using a first asymmetrical cropping ratio, and the enlarged portion of the second ROI can be presented on the display by digitally cropping the second frame using a second asymmetrical cropping ratio that may be different from the first asymmetrical cropping ratio.

In some implementations, the display can be a touch-sensitive display, and the device can receive directional input from the user by presenting a number of directional indicators on the display, and detecting user interaction with one of the directional indicators. In other implementations, the directional input can be one of a swiping input or gesture, a flicking input or gesture, or a dragging input or gesture. In some implementations, execution of the instructions can cause the device to determine camera settings based on one or more buffered frames of the preview stream, wherein presenting the enlarged portion of the second ROI on the display is based, at least in part, on the determined camera settings. In addition, or in the alternative, the number of operations can also include adjusting a size of the enlarged portion of the second ROI based on one or more user inputs. In some aspects, the one or more user inputs can include at least one of a pinching gesture or a stretching gesture.

Another innovative aspect of the subject matter described in this disclosure can be implemented in an apparatus. In some implementations, the apparatus can include means for receiving a preview stream of a scene from a camera, means for presenting the preview stream on a display of the apparatus, means for enlarging a first region of interest (ROI) of the scene presented on the display, means for receiving directional input from a user indicating a second ROI of the scene (such that at least a portion of the second ROI is not currently presented on the display with the enlarged first ROI), means for transitioning from the enlarged first ROI to an enlarged portion of the second ROI based on the received directional input without adjusting a zoom level of the camera, and means for presenting the portion of the second ROI on the display. The enlarged first ROI can be presented on the display without adjusting the zoom level of the camera, and the enlarged portion of the second ROI can be presented on the display without adjusting the zoom level of the camera. In some implementations, the first ROI can be enlarged by digitally cropping a first frame of the preview stream, and the enlarged portion of the second ROI can be presented on the display by digitally cropping a second frame of the preview stream. In some aspects, the first ROI can be enlarged by digitally cropping the first frame using a first asymmetrical cropping ratio, and the enlarged portion of the second ROI can be presented on the display by digitally cropping the second frame using a second asymmetrical cropping ratio that may be different from the first asymmetrical cropping ratio.

In some implementations, the display can be a touch-sensitive display, and the apparatus can receive directional input from the user by presenting a number of directional indicators on the display, and detecting user interaction with one of the directional indicators. In other implementations, the directional input can be user input (such as one of a swiping input or gesture, a flicking input or gesture, or a dragging input or gesture). In some implementations, the apparatus can include means for determining camera settings based on one or more buffered frames of the preview stream, wherein presenting the enlarged portion of the second ROI on the display is based, at least in part, on the determined camera settings. In addition, or in the alternative, the apparatus can also include means for adjusting a size of the enlarged portion of the second ROI based on one or more user inputs. In some aspects, the one or more user inputs can include at least one of a pinching gesture or a stretching gesture.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
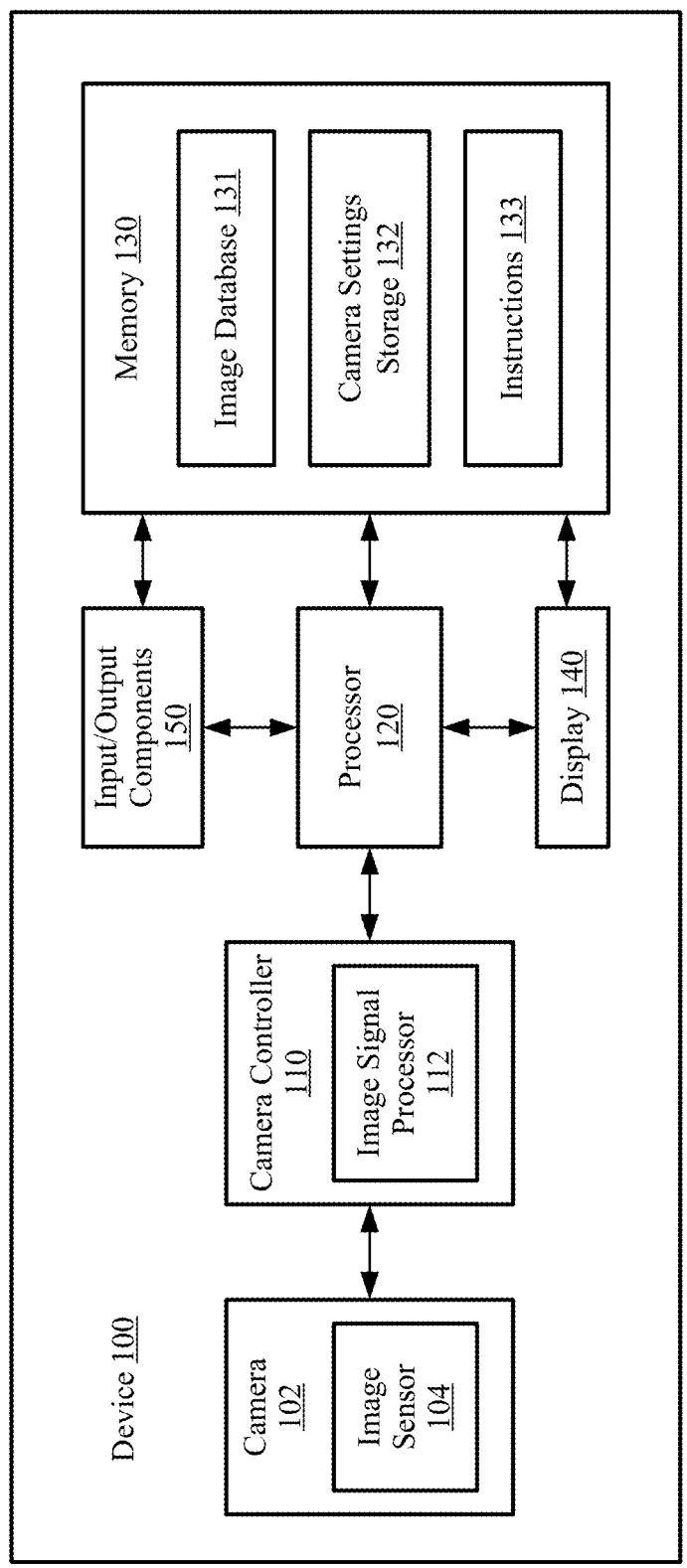
FIG. 1 is a block diagram of an example device within which aspects of the present disclosure may be implemented.

The systems and methods disclosed herein relate to zooming in or enlarging a portion of a preview stream of a scene presented on a display of a device. In accordance with some aspects of the present disclosure, a device may receive the preview stream from a camera coupled to or associated with the device, and may present a full field of view (FOV) of the scene as a preview stream on a display of the device (such as for viewing by a user). The device may enlarge a first region of interest (ROI) of the scene presented on the display without changing or adjusting a zoom level of the camera by digitally cropping a first frame of the preview stream. In some aspects, the enlarged first ROI may occupy a same or similar amount of the display that was previously occupied by the preview stream of the full FOV of the scene.

The user may select a different ROI of the preview stream to be enlarged and presented on the display without moving, panning, or titling the camera and without adjusting a zoom level of the camera. In some implementations, the device may receive directional input provided by the user indicating a second ROI of the scene (such that at least a portion of the second ROI is not currently presented on the display with the enlarged first ROI), and may transition from the enlarged first ROI to an enlarged portion of the second ROI based on the received directional input. In some aspects, the device may transition from the enlarged first ROI to the enlarged portion of the second ROI without adjusting the zoom level of the camera by digitally cropping one or frames of the preview stream using an asymmetrical cropping ratio.

The directional input may be any suitable user input (such as a touch input on the display or a non-touch gesture input sensed by the display) from which the device can interpret a direction in which to transition from presenting the first ROI to presenting the enlarged portion of the second ROI on the display. For one example, the device may transition from the enlarged first ROI to enlarged portions of regions of the scene as one moves in an upward direction in the preview stream based on the user swiping or flicking upwards on the display, and may transition from the enlarged first ROI to enlarged portions of regions of the scene as one moves in a downward direction in the preview stream based on the user swiping or flicking downwards on the display. For another example, the device may transition from the enlarged first ROI to enlarged portions of regions of the scene as one moves to the right in the preview stream based on the user swiping or flicking towards a right edge of the display, and may transition from the enlarged first ROI to enlarged portions of regions of the scene as one moves to the left in the preview stream based on the user swiping or flicking towards a left edge of the display.

In other implementations, the device may present a number of directional indicators on the display, and may transition between presenting enlarged portions of different ROIs of the scene on the display based on user interaction with the directional indicators. In some aspects, the directional indicators may include (but are not limited to) a left directional indicator, a right directional indicator, an up directional indicator, and a down directional indicator. For one example, the device may transition the enlarged portion of the preview stream upwards in the scene based on the user touching or selecting the up directional indicator, and may transition the enlarged portion of the preview stream downwards in the scene based on the user touching or selecting the down directional indicator. For another example, the device may transition the enlarged portion of the preview stream to the right in the scene based on the user touching or selecting the right directional indicator, and may transition the enlarged portion of the preview stream to the left in the scene based on the user touching or selecting the left directional indicator.

In this manner, the device may allow the user to select different regions of the preview stream for enlargement and presentation on the display without adjusting the zoom level of the camera (e.g., while the camera remains in the same zoom level) and without requiring the user to move, pan, tilt, or otherwise re-position the device (or the camera). In some implementations, the device may determine camera settings based on one or more buffered frames of the preview stream, and may use the determined camera settings to more quickly transition between presenting different enlarged portions of the preview stream on the display (such as compared to determining new camera settings for the different enlarged portions of the preview stream).

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

The term "coupled" as used herein means connected directly to or connected through one or more intervening components or circuits. As used herein, the term "camera" may refer to a set of image sensing components that typically include a sensor array (or "sensor") and one or more optical components (for example, one or more lenses or light re-directing components, sometimes referred to herein as "optics" or "set of optics") through which light from a target scene propagates before the light reaches the sensor array. In some embodiments, a multi-camera device may include multiple cameras, each including a set of optics and a corresponding sensor array. In other examples of devices with multiple cameras, a particular set of optics may correspond to two or more sensors, that is, provide light to two or more sensors. As used herein, the term "zoom level" may refer to an optical zoom amount of a camera, a digital zoom amount of the camera, or both, and may indicate camera focus settings such as focal length and focus distance. Further, as used herein, the terms "frame," "preview frame," and "preview image" may refer to a single frame of a preview stream provided by a camera and presented on a display of a device, for example, such that the preview stream is composed of a plurality of sequential frames each presented on the display for a discrete period of time.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram of an example device 100 within which various aspects of the present disclosure may be implemented. In some implementations, the device 100 may be a mobile device such as, for example, a smartphone, tablet computer, laptop computer, personal digital assistant, or the like. In other implementations, the device 100 may be a stationary device such as, for example, a desktop computer, a security system, a fixed digital camera, or the like. In some other implementations, the device 100 may be a system that does not include a camera, but rather receives preview streams, video, captured images, and other suitable image data from a remote camera that can be connected to the device using either a wired connection or a wireless connection. For example, the remote camera may be a security camera, and the example device 100 may be a mobile phone, laptop, tablet, or personal computer.

The device 100 may include a camera 102, a camera controller 110, a processor 120, a memory 130, a display 140, and any number of input/output (I/O) components 150. The camera 102, which is shown to include an image sensor 104, may be used for capturing images or video, and may also be used to generate a preview stream of a scene that can be presented on the display 140. In some aspects, the preview stream generated by the camera 102 may not be captured and stored in memory 130, for example, until a user instructs the device 100 to capture one or more frames of preview stream. Although not shown for simplicity, the camera 102 may include a zoom lens and a focus adjuster. The focus adjuster may adjust the focal length and focus distance of the zoom lens to focus light as it passes through the zooms lens and is received by the image sensor 104. The zoom lens may have a variable-size aperture that is expressed by an f-number (which may be expressed as the focal length divided by the aperture diameter). The zoom lens passes light to the image sensor 104 which forms an image thereon. The image sensor 104 may have a number of aspect ratios (such as 4:3 and 16:9 image aspect ratios), and may have a number of image resolutions. The image sensor 104 may be a charge-coupled device (CCD) sensor, a complementary metal-oxide semiconductor (CMOS) sensor, or any other suitable image sensor. In other implementations, the camera 102 may include a fixed focal length lens (rather than a zoom lens), and digital zoom operations may be performed by the camera controller 110 (such as by using an image signal processor 112 for digital image processing).

Images and video generated or captured by the camera 102 may be processed by one or more components of the device 100 including, for example, the camera controller 110 or the processor 120. In some implementations, the image sensor 104 may include one or more color filter arrays (CFAs) arranged on a surface of the respective sensors. In other implementations, the image sensor 104 may include arrays of solid state sensor elements such as complementary metal-oxide semiconductor (CMOS) sensor elements. In some other implementations, the image sensor 104 may include other suitable types of image sensors for generating or capturing images.

Although the device 100 is shown in FIG. 1 as including only one camera 102, in other implementations, the device 100 may include any suitable number of cameras that may be arranged in any suitable configuration. For implementations in which the device 100 includes multiple cameras, the multiple cameras may have similar or different capabilities (such as resolution, color or black and white, a wide angle lens versus a telephoto lens, zoom capabilities, and so on), and may be positioned on any suitable face (such as the front face or the back face) of the device 100. Accordingly, although described herein with respect to the device 100 of FIG. 1, aspects of the present disclosure are equally applicable to multi-camera devices (such as to devices including or associated with a telephoto camera and a wide-angle camera).

The camera controller 110, which may control various operations of the camera 102 and the image sensor 104, is shown to include an image signal processor 112 that may process images and/or video provided by the camera 102. In some implementations, the image signal processor 112 may execute instructions from a memory (such as instructions stored in the memory 130 or instructions stored in a separate memory coupled to the image signal processor 112) to control various operations of the camera 102, and/or may execute instructions from the memory to process images and/or video provided by the camera 102 (such as presenting a full FOV of a scene as a preview stream on the display 140, zooming in on a selected region of interest (ROI) of the scene by enlarging the selected ROI presented on the display 140, and transitioning from presenting the enlarged selected ROI on the display 140 to presenting an enlarged portion of another ROI on the display 140 based on user input). The processed images or video may be stored in a memory (such as the memory 130), may be presented to a user for viewing on the display 140, or both. In some aspects, images generated by the camera 102 or acquired by the image sensor 104 may be presented in real-time to the user a preview stream. In addition, or in the alternative, images and/or video captured by the camera 102 and/or processed by the image signal processor 112 may be presented on the display 140.

In some other implementations, the image signal processor 112 may include specific hardware to control various operations of the camera 102 and/or to process images and/or video provided by the camera 102. The image signal processor 112 may alternatively or additionally include a combination of specific hardware and the ability to execute software instructions. Further, although not shown in FIG. 1 for simplicity, the image signal processor 112 may include one or more image processing cores (such as a video encoding core), one or more image compression cores, or both.

The display 140 may be any suitable display or screen for presenting images such as, for example, preview streams, captured images, video, data, graphics, and other suitable information or items for viewing by the user. In some implementations, the display 140 may be a touch-sensitive display configured to detect user input. The user input may be any suitable gesture or touch input that can be detected by the display 140 and interpreted by the processor 120 to perform a corresponding function or operation. In some aspects, the processor 120 may determine one or more attributes of the gesture or touch input including, for example, a location of the gesture or touch input, a direction of the gesture or touch input, a pressure of the gesture or touch input, a duration of the gesture or touch input, and so on.

The user input may be detected from the user (such as the user's finger and/or thumb), from a stylus, from a pen, from a pointer, or from any other suitable object depending on the configuration and capabilities of the display 140. In some implementations, the term "touch input" may refer to any touch event on the display 140 that begins at an origin point and continues to an end point on the display 140. A touch input may be identified by one or more attributes including the origin point, the end point, the distance travelled, the duration, the velocity, and the direction of the touch input. In some aspects, touch inputs may include (but are not limited to) swiping, dragging, flicking, pinching, and/or stretching touches on the display. The term "gesture input" may refer to any suitable non-touch user input that can be detected by the display (or by another suitable component of the device 100). In some aspects, gesture inputs may include (but are not limited to) a swiping gesture, a dragging gesture, a flicking gesture, a pinching gesture, and/or a stretching gesture performed on a portion of the display 140. In addition, or in the alternative, the user input may include user interaction with one or more directional indicators presented on the display 140.

The I/O components 150 may be or may include any suitable mechanism, interface, or device to receive input (such as commands) from the user and/or to provide output to the user. For example, the I/O components 150 may include (but are not limited to) a graphical user interface, a keyboard or keypad, a mouse, one or more physical buttons, and/or other suitable mechanisms to receive inputs and commands from the user. In some aspects, the I/O components 150 may also include microphone and speakers. In some implementations, the display 140 or the I/O components 150 (or both) may receive user input for selecting or adjusting one or more settings of the camera controller 110 and/or for selecting or adjusting one or more settings of the camera 102.

In some implementations, the image sensor 104 within the camera 102 may capture a limited range of brightness or light intensity when generating or capturing an image of a scene. A conventional image captured with a limited or standard range of brightness is called a limited-dynamic range (LDR) image or a standard-dynamic range (SDR) image. For example, the device 100 may capture an LDR or SDR image using an automatically determined exposure value (such as an auto-exposure (AE) setting) and an undesirably limited range of brightness captured for the captured image. Although a person may be able to perceive a relatively large range of brightness and light effects of a scene (such as shadows and color contrasts), an LDR or SDR image may capture a relatively small range of brightness and light effects of the scene, and may therefore appear muted or dull compared to the scene as perceived by the person.

Many digital cameras employ high-dynamic range (HDR) imaging to compensate for the limited range of brightness captured by LDR and SDR images. In HDR imaging, multiple LDR or SDR images may be captured with different exposure values, and the captured LDR or SDR images may be combined to create an HDR image that includes capture information for a larger range of exposures than any of the individual LDR or SDR images. In some implementations, the device 100 may capture a plurality of LDR or SDR images having different exposures (and thus having different ranges of brightness), and then combine one or more portions of a number of the captured LDR or SDR images to generate an HDR image. In some aspects, the device 100 may use blending, mixing, and/or merging techniques when combining the number of the captured LDR or SDR images to generate the HDR image. In this manner, the resulting HDR image may have a greater range of brightness than any of the individual LDR or SDR images.

In some implementations, the image sensor 104 may capture multiple LDR images of the same scene using different exposure values. Exposure values (EV) may be expressed in terms of f-values or stops, and may be measured as an amount of brightness for a unit of area (such as in units of candelas per square feet ($cd/ft^2$) or candelas per square meter ($cd/m^2$)). One stop above or more refers to a doubling of the amount of light received by the image sensor 104 (such as $2*x$ $cd/ft^2$), and one stop below or less refers to a halving of the amount of light received by the image sensor 104 (such as $x/2$ $cd/ft^2$). The exposure values may be changed by adjusting the shutter speed of the camera 102, by adjusting the sensitivity of the image sensor 104 (such as measured in ISO), and/or by adjusting the aperture size of the camera 102.

In some implementations, the device 100 may use an auto-exposure (AE) setting when capturing images of a scene (or when generating a preview stream of the scene for presentation on the display 140). The AE setting may be used to adjust the camera settings so that a captured image will have a target brightness. For example, when the image sensor 104 is activated, information from the image sensor 104 may be used to generate a preview stream that includes a plurality of preview frames. One or more characteristics of the preview frames (such as color contrast, brightness, and so on) may be used to determine initial camera settings for capturing images. In some implementations, the device 100 may buffer one or more frames of the full FOV of a preview stream of a scene, determine camera settings used to generate the buffered frames of the scene, and store the determined camera settings in a memory (such as in the camera settings storage 132 of the memory 130). In some aspects, the camera settings may include (but are not limited to) auto white balance (AWB) settings, auto-focus (AF) settings, and auto-exposure (AE) settings used to generate the buffered frames.

Because the stored camera settings correspond to the camera settings that were used to generate previously buffered frames of the preview stream, the device 100 may use the determined camera settings to transition from presenting an enlarged first ROI of the scene on the display 140 to presenting an enlarged portion of a second ROI of the scene on the display 140 without adjusting the zoom level of the camera. More specifically, because each of the auto white balance, the auto-focus, and the auto-exposure settings takes time to settle and changes very little (if at all) between consecutive frames of a preview stream (assuming the scene and/or the FOV has changed very little, if at all), the device 100 may use the stored camera settings to "move" the enlarged ROI of the scene to different areas of the preview stream by transitioning from presenting an enlarged first ROI of the scene on the display 140 to presenting an enlarged portion of a second ROI of the scene on the display 140, thereby eliminating a need to reset the camera settings or to determine new camera settings when presenting different enlarged portions of the scene on the display 140. In this manner, aspects of the present disclosure may not only allow a user to select a number of different regions of a preview stream to be enlarged and presented on the display 140 while the zoom level of the camera 102 remains the same, but may also prevent the preview stream from being too bright (which may happen in conventional camera because resetting the camera settings takes longer than the time interval between successive frames of the preview stream).

In addition, or in the alternative, the device 100 may update the stored camera settings with newer camera settings associated with more recent frames of the preview stream received from the camera 102. For example, if the stored camera settings are based on the $N^{th}$ and $N^{th}+1$ frames of the preview stream (where N is an integer greater than or equal to one) and the device 100 is currently presenting the $N^{th}+50$ frame of the preview stream on the display 140, then the device 100 may obtain the camera settings used for the $N^{th}+50$ frame (and/or one or more previous frames such as the $N^{th}+49$ frame) of the preview stream and update the stored camera settings with the newer camera settings. In some other implementations, the device 100 may replace the stored camera settings with the newer camera settings. In this manner, the camera settings used by the device 100 to present different enlarged portions of the scene on the display 140 may be updated or replaced with the passage of time, for example, to ensure that the stored camera settings correspond to the current conditions of the scene.

The processor 120 may be any suitable one or more processors capable of executing scripts or instructions of one or more software programs stored in the device 100 (such as within the memory 130). In some implementations, the processor 120 may be or include one or more microprocessors providing the processor functionality and external memory providing at least a portion of machine-readable media. In other implementations, the processor 120 may be or include an Application Specific Integrated Circuit (ASIC) with the processor, the bus interface, the user interface, and at least a portion of the machine-readable media integrated into a single chip. In some other implementations, the processor 120 may be or include one or more Field Programmable Gate Arrays (FPGAs) or Programmable Logic Devices (PLDs).

The memory 130 may include an image database 131 to store images and video captured or obtained by the camera 102, to store images and video generated by the image sensor 104, or to store images and video provided by another device. The stored images may include one or more buffered frames of a preview stream. The stored images may also include a number of captured images.

The memory 130 may also include a camera settings storage 132 to store camera settings used to generate the preview stream for a given scene. The camera settings may include (but are not limited to) an auto white balance (AWB) setting, an auto-focus (AF) setting, and an auto-exposure (AE) setting. In some implementations, each of the camera settings may be based on one or more buffered frames of a given preview stream (such as by averaging the camera settings associated with the one or more buffered frames of the given preview stream). For example, when the device 100 presents a preview stream on the display 140, the device 100 may temporarily buffer one or more frames of the preview stream, and may determine the AWB setting, the AF setting, and the AE setting associated with generating the buffered frames. In some aspects, the device 100 may determine an average AWB setting, an average AF setting, and an average AE setting associated with the buffered frames of the preview stream.

The memory 130 may also include a non-transitory computer-readable medium (such as one or more nonvolatile memory elements, such as EPROM, EEPROM, Flash memory, a hard drive, and so on) that may store computer-executable instructions 133 to perform all or a portion of one or more operations described in this disclosure. In some implementations, the processor 120 may execute a number of the instructions 133 stored in the memory 130 to cause the device 100 to perform any number of different functions or operations such as, for example, one or more operations of FIGS. 5-7. While shown to be coupled to each other via the processor 120 in the example of FIG. 1, the camera controller 110, the processor 120, the memory 130, display 140, and the I/O components 150 may be coupled to one another in various arrangements. For example, the camera controller 110, the processor 120, the memory 130, display 140, and the I/O components 150 may be coupled to each other via one or more local buses (not shown for simplicity).

The device 100 may include additional features or components not shown in FIG. 1 for simplicity. For example, a wireless interface, which may include one or more transceivers and baseband processors, may be included for a wireless communication device. Additionally, the device 100 may include or may be coupled to additional cameras other than the camera 102. The disclosure should not be limited to any specific examples or illustrations, including the example device 100. In other implementations, the device 100 may include fewer components than those shown in FIG. 1. For example, in some implementations, the device 100 may not include a camera, and instead may be coupled (using either a wired connection or a wireless connection) to one or more remotely-located cameras (not shown for simplicity).

The term "device" is not limited to one or a specific number of physical objects (such as one smartphone). As used herein, a device may be any electronic device with multiple parts that may implement at least some portions of this disclosure. While the below description and examples use the term "device" to describe various aspects of this disclosure, the term "device" is not limited to a specific configuration, type, or number of objects.

In accordance with some aspects of the present disclosure, the device 100 may allow a user to zoom in or enlarge a first ROI of a preview stream so that the enlarged first ROI is presented on the display 140, and may thereafter allow the user to cause the device 100 to transition from presenting the enlarged first ROI on the display 140 to presenting an enlarged portion of a second ROI on the display 140 without adjusting the zoom level of the camera. In this manner, the device 100 may allow the user to select different portions of the preview stream to be enlarged and presented on the display 140 while the camera remain at the same zoom level.

Figure 2:
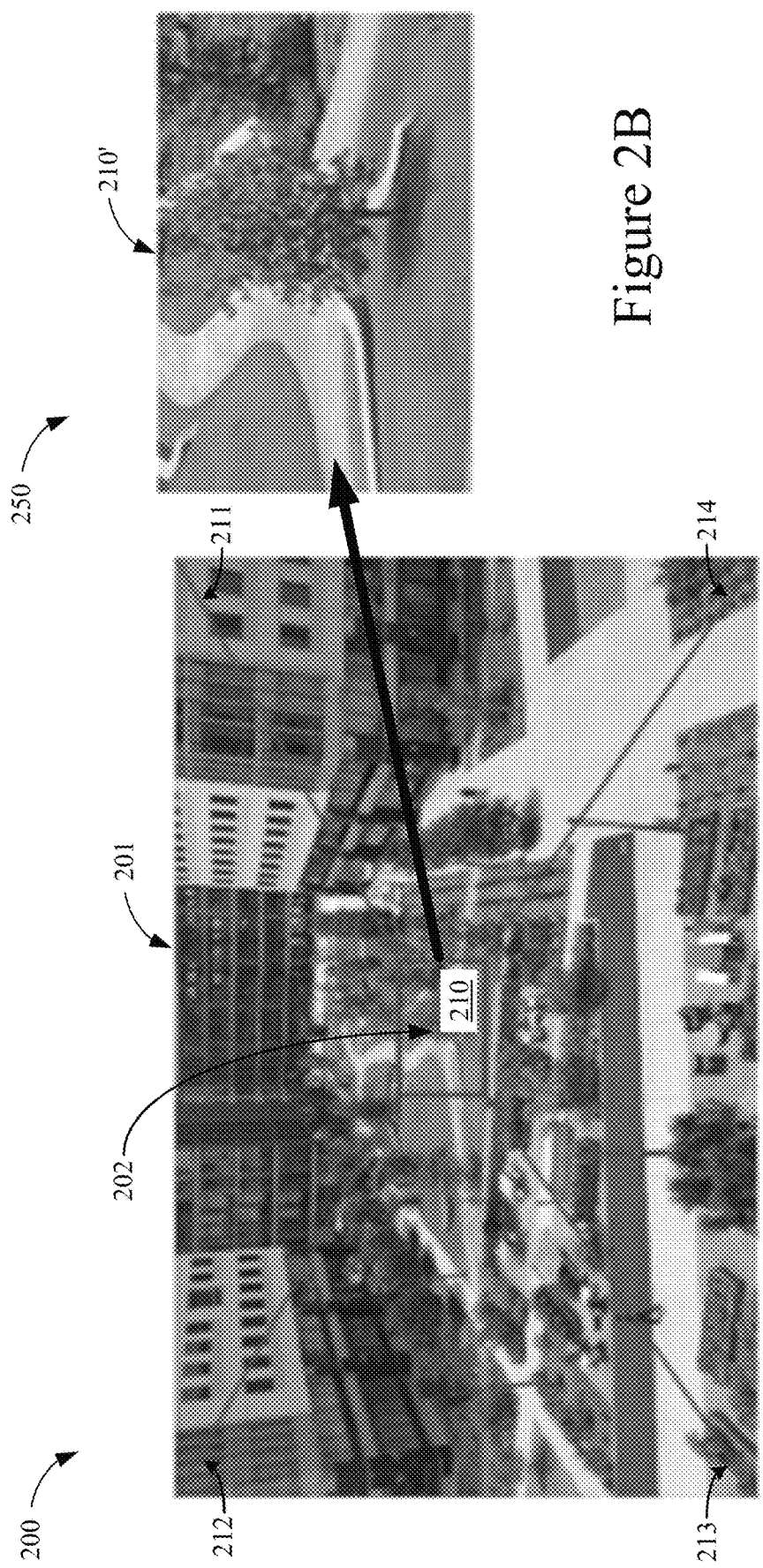
FIG. 2A is an illustration depicting an example preview stream of a scene.
FIG. 2B is an illustration depicting an enlarged region of interest of the scene of FIG. 2A.

FIG. 2A is an illustration 200 depicting an example preview stream 201 of a scene. The preview stream 201 may be presented on the display 140 of the device 100 as the full field of view (FOV) of the camera 102 of FIG. 1. The device 100 may receive a zoom-in command from the user, and may enlarge a first region of interest (ROI) 210 of the preview stream 201 presented on the display 140 of the device 100. In some implementations, the device 100 may select the first ROI 210 based on a center point of the camera's FOV (such as a center point 202 of the preview stream 201 presented on the display 140). In some aspects, the device 100 may present diagonal crosshair lines 211-214 on the display 140 to identify the first ROI 210.

In other implementations, the user may select an ROI that occupies any suitable portion of the preview stream 201 (such as an ROI that does not include the center point 202). In some implementations, the user may touch or tap on a point or area on the display 140 to select a center point of an ROI to be enlarged during zoom-in on the preview stream, and the device 100 may define the corresponding ROI based on the center point selected by the user. The device 100 may use any suitable technique to define the boundaries of the ROI relative to the center point selected by the user. For example, the device 100 may define the ROI to be enlarged as the area within a square or rectangle centered about the user-selected center point and having a selected width and length. In some aspects, the device 100 may select the width and length of the ROI to be enlarged. In other aspects, the user may select the width and length of the ROI to be enlarged. In this manner, the user may select any desired region of interest within the preview stream 201 to be enlarged, for example, rather than relying upon the device 100 to select the ROI based on the center of the camera's FOV.

In other implementations, the user may use touch or tap gestures to define the ROI to be enlarged during the zoom-in operation, and the device 100 may define the corresponding ROI based on the touch or tap gestures. For one example, the user may touch or tap two or more points on the display 140 to identify corners of a square or rectangle that defines the ROI. For another example, the user may use a stretching gesture on the display 140 to identify corners of a square or rectangle that defines the ROI.

In response to receiving the zoom-in command from the user, the device 100 may enlarge the selected ROI presented on the display 140. FIG. 2B is an illustration 250 depicting an enlarged ROI 210' presented on the display 140 of the device 100, where the enlarged ROI 210' corresponds to the selected ROI 210 of FIG. 2A. In some implementations, the device 100 may present only the enlarged ROI 210' on the display 140, for example, such that the enlarged ROI 210' occupies a same or similar amount of the display 140 that was previously occupied by the entire preview stream 201 of FIG. 2A.

In some implementations, the device 100 may receive directional input from the user indicating a second ROI of the scene, and may transition from the enlarged first ROI to an enlarged portion of the second ROI based on the received directional input without adjusting a zoom level of the camera 102. The directional input may be any suitable touch or gesture input from which the device 100 can interpret a desired direction in which to transition from presenting the first ROI on the display 140 to presenting the second ROI on the display (such that an enlarged portion of the scene is "moved" across the preview stream 201). In some implementations, the device 100 may move the enlarged ROI (such as by transitioning from presenting the first ROI on the display 140 to presenting the enlarged portion of the second ROI on the display 140) based on one or more user inputs on the display 140. In some aspects, the user input may be a swiping, flicking, or dragging touch input or gesture. For example, the device 100 may move the enlarged portion of the scene in an upward direction based on the user swiping, flicking, or dragging upwards on the display 140, may move the enlarged portion of the scene in a downward direction based on the user swiping, flicking, or dragging downwards on the display 140, may move the enlarged portion of the scene to the right based on the user swiping, flicking, or dragging towards the right edge of the display 140, and may move the enlarged portion of the scene to the left based on the user swiping, flicking, or dragging towards the left edge of the display 140.

In other implementations, the device 100 may present a number of directional indicators on the display 140, and may move the enlarged portion of the scene presented on the display 140 (such as by transitioning from presenting the first ROI on the display 140 to presenting the enlarged portion of the second ROI on the display 140) based on user interaction with the directional indicators. In some aspects, the directional indicators may include (but are not limited to) an up directional indicator, a down directional indicator, a right directional indicator, and a left directional indicator.

Figure 3:
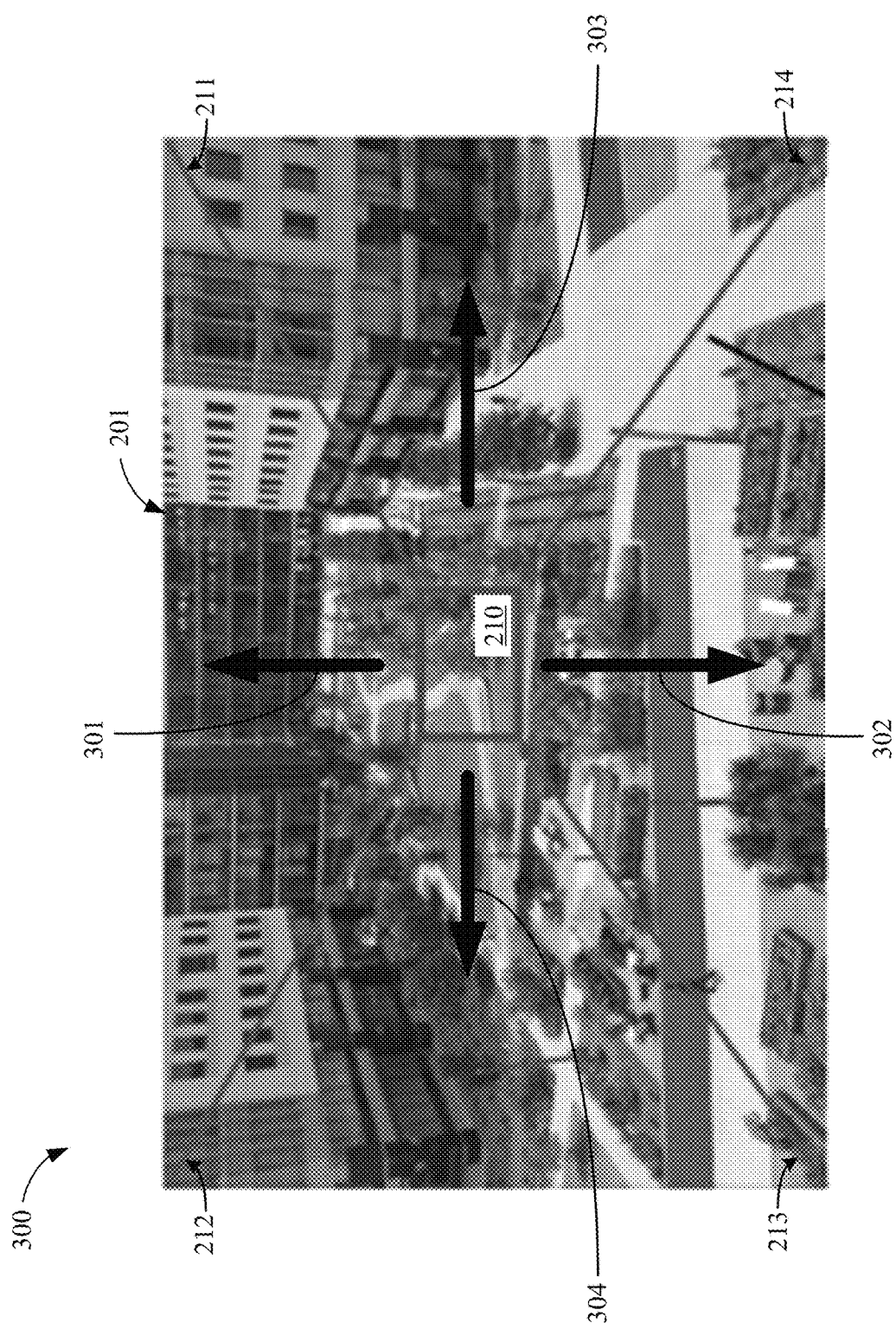
FIG. 3 is an illustration depicting another example preview stream of the scene.

FIG. 3 is an illustration 300 depicting another example preview stream 201 of the scene. As depicted in FIG. 3, the device 100 may present a number of directional indicators 301-304 on the preview stream 201. Although the diagonal crosshair lines 211-214 are presented to identify the first ROI 210 in the illustration 300, in other implementations, the diagonal crosshair lines 211-214 may not be presented on the display. The directional indicator 301 points upwards towards a top edge of the display 140, the directional indicator 302 points downward towards a bottom edge of the display 140, the directional indicator 303 points rightwards towards a right edge of the display 140, and the directional indicator 304 points to leftwards towards a left edge of the display 140 (the display 140 not shown in FIG. 3 for simplicity).

The device 100 may move the enlarged portion of the preview stream presented on the display 140 in the upward direction in the scene based on user interaction with the "upward" directional indicator 301, may move the enlarged portion of the preview stream presented on the display 140 in the downward direction in the scene based on user interaction with the "downward" directional indicator 302, may move the enlarged portion of the preview stream presented on the display 140 to the right in the scene based on user interaction with the "rightward" directional indicator 303, and may move the enlarged portion of the preview stream presented on the display 140 to the left in the scene based on user interaction with the "leftward" directional indicator 304. In other implementations, a number of additional directional indicators may be presented on the display 140. In this manner, the device 100 may allow the user to move the enlarged portion of the preview stream presented on the display 140 to different areas or portions of the full FOV of the scene without adjusting a zoom level of the camera 102 and/or without requiring the user to re-position the device 100.

In accordance with some aspects of the present disclosure, the device 100 may enlarge a selected ROI of the preview stream by processing a buffered frame of the preview stream and then digitally cropping the processed frame to enlarge the selected ROI. As such, the entirety of buffered frames of the preview stream—which includes the full FOV of the scene—is available for enlarging different ROIs of the preview stream (such as by digitally cropping different portions of the processed frame). In this manner, the device 100 can enlarge any portion of the preview stream, without adjusting the zoom level of the camera 102, by digitally cropping a buffered frame of the preview stream. In other words, although the device 100 may present an enlarged ROI of the scene on the display 140, the camera 102 does not perform a zoom operation and therefore may continue to provide frames or a preview stream of the full FOV of the scene for presentation on the display 140.

In some implementations, the device 100 may buffer one or more frames of the full FOV of a preview stream of the scene, determine camera settings used to generate the buffered frames, and store the determined camera settings in a memory (such as in the camera settings storage 132 of the memory 130). In some aspects, the camera settings may include (but are not limited to) auto white balance (AWB) settings, auto-focus (AF) settings, and auto-exposure (AE)

settings used to generate the buffered frames of the preview stream 201. Because the stored camera settings correspond to camera settings that the device 100 has already determined for previous frames of the scene, the device 100 may use the determined camera settings to move the enlarged portion of the preview stream 201 presented on the display 140 to different areas or portions of the full FOV of the scene without adjusting the zoom level of the camera 102. More specifically, because each of the auto white balance, the auto-focus, and the auto-exposure settings takes time to settle and changes very little (if at all) between consecutive frames of the preview stream 201 (assuming that the scene and/or the FOV has changed very little, if at all), the device 100 may use the stored camera settings to move the enlarged portion of the preview stream presented on the display around the camera's FOV of the scene without resetting the camera settings or determining new camera settings. In this manner, the device 100 may not only allow a user to move an enlarged portion of the preview stream presented on the display 140 to different areas or portions of the full FOV of the scene without adjusting the zoom level of the camera 102, but may also prevent the preview stream 201 from being too bright (which may happen in conventional cameras because resetting the camera settings typically takes longer than the time interval between successive frames of the preview stream).

Figure 4A:
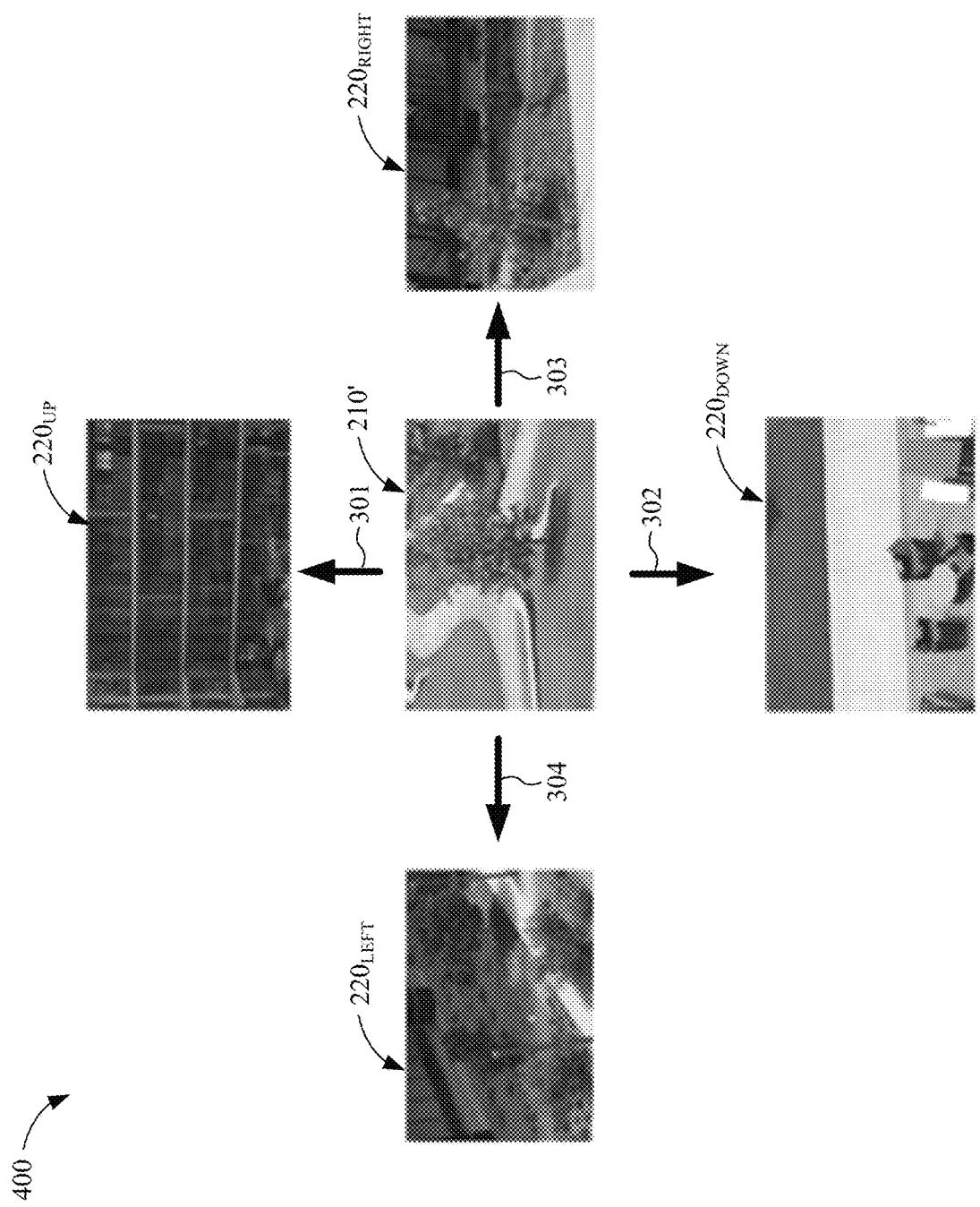
FIG. 4A is an illustration depicting a number of enlarged regions of interest of the preview stream of FIG. 3.

FIG. 4A is an illustration 400 depicting a number of enlarged regions of interest of the preview stream 201 of FIG. 3. The enlarged ROI 210' of FIG. 4A is a representation of the enlarged ROI 210' depicted in FIG. 2B, and may be presented on the entirety of (or at least occupy substantially all of) the display 140. In implementations for which the device 100 or the user selects the ROI 210 of FIG. 2A and FIG. 3 to be enlarged, the device 100 may present the enlarged ROI 210' on the display 140 (such as in response to receiving a zoom-in command).

In some implementations, the device 100 may present directional indicators 301-304 on the preview stream 201, and may transition from the enlarged first ROI to an enlarged portion of a second ROI based on user interaction with the directional indicators 301-304. For one example, if the user selects or interacts with the "upward" directional indicator 301, the device 100 may "move" the enlarged portion of the preview stream upwards in the full FOV of the scene such that the device 100 transitions from presenting the enlarged ROI 210' on the display 140 to presenting the enlarged ROI $220_{UP}$ on the display 140. For another example, if the user selects or interacts with the "downward" directional indicator 302, the device 100 may "move" the enlarged portion of the preview stream downwards in the full FOV of the scene such that the device 100 transitions from presenting the enlarged ROI 210' on the display 140 to presenting the enlarged ROI $220_{DOWN}$ on the display 140. For another example, if the user selects or interacts with the "rightward" directional indicator 303, the device 100 may "move" the enlarged portion of the preview stream to the right in the full FOV of the scene such that the device 100 transitions from presenting the enlarged ROI 210' on the display 140 to presenting the enlarged ROI $220_{RIGHT}$ on the display 140. For another example, if the user selects or interacts with the "leftward" directional indicator 304, the device 100 may "move" the enlarged portion of the preview stream to the left in the full FOV of the scene such that the device 100 transitions from presenting the enlarged ROI 210' to presenting the enlarged ROI $220_{LEFT}$ on the display 140. In some aspects, the user may interact with the directional indicators 301-304 by touching, tapping, or otherwise selecting one of the directional indicators 301-304 presented on the display 140.

It is to be understood that although only four enlarged ROIs $220_{UP}$, $220_{DOWN}$, $220_{RIGHT}$, and $220_{LEFT}$ are depicted in the example of FIG. 4A, the user may cause the device 100 to transition from the first ROI 210' to any number of other enlarged ROIs of the scene. For example, when the user selects the directional indicator 303, the device 100 may present portions of one or more intermediate enlarged ROIs on the display 140 before presenting an enlarged portion of the ROI $220_{RIGHT}$ on the display 140. Thus, in some implementations, the device 100 may not necessarily jump from the enlarged first ROI 210' to the ROI $220_{RIGHT}$, but rather continuously present enlarged portions of ROIs positioned between the enlarged first ROI 210' and the ROI $220_{RIGHT}$.

Figure 4B:
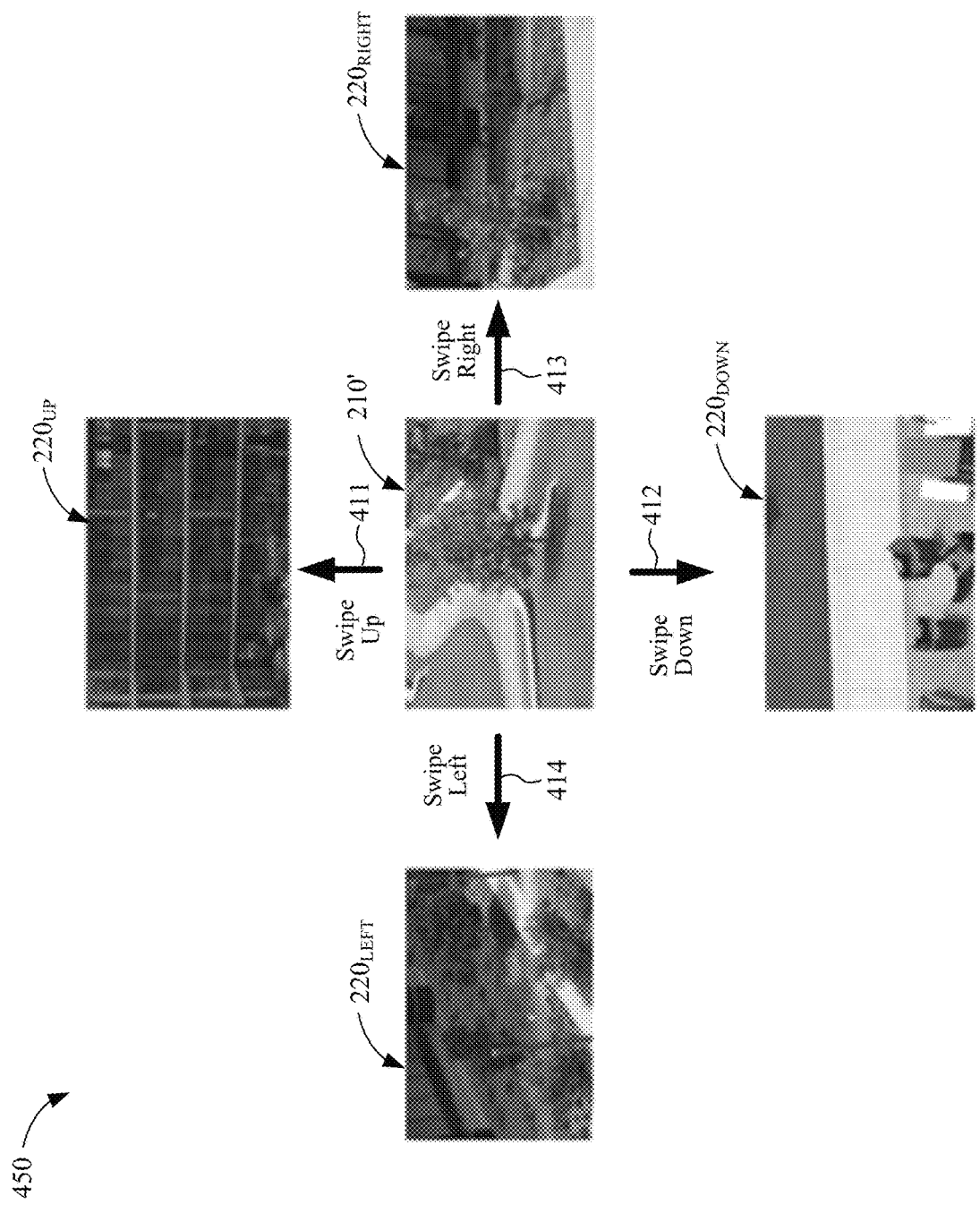
FIG. 4B is another illustration depicting a number of enlarged regions of interest of the preview stream of FIG. 3.

In other implementations, the user may instruct the device 100 to transition between presenting different enlarged portions of the preview stream on the display 140 using gestures or touch inputs (rather than using directional indicators 301-304 presented on the display 140). FIG. 4B is another illustration 450 depicting a number of enlarged regions of interest of the preview stream 201 of FIG. 3. The enlarged ROI 210' of FIG. 4B is a representation of the enlarged ROI 210' depicted in FIG. 2B, and may be presented on the entirety of (or at least occupy substantially all of) the display 140. For one example, the user may cause the device 100 to "move" the enlarged portion of the preview stream in the upward direction, such that the device 100 transitions from presenting the enlarged ROI 210' on the display 140 to presenting the enlarged ROI $220_{UP}$ on the display 140, by providing an upwards swipe input or swiping gesture 411 on the display 140. For another example, the user may cause the device 100 to "move" the enlarged portion of the preview stream in the downward direction, such that the device 100 transitions from presenting the enlarged ROI 210' to presenting the enlarged ROI $220_{DOWN}$ on the display 140, by providing a downwards swipe input or swiping gesture 412 on the display 140. For another example, the user may cause the device 100 to "move" the enlarged portion of the preview stream to the right, such that the device 100 transitions from presenting the enlarged ROI 210' to presenting the enlarged ROI $220_{RIGHT}$ on the display 140, by providing a rightwards swipe input or swiping gesture 413 on the display 140. For another example, the user may cause the device 100 to "move" the enlarged portion of the preview stream to the left, such that the device 100 transitions from presenting the enlarged ROI 210' to presenting the enlarged ROI $220_{LEFT}$ on the display 140, by providing a leftwards swipe input or swiping gesture 414 on the display 140.

Figure 5:
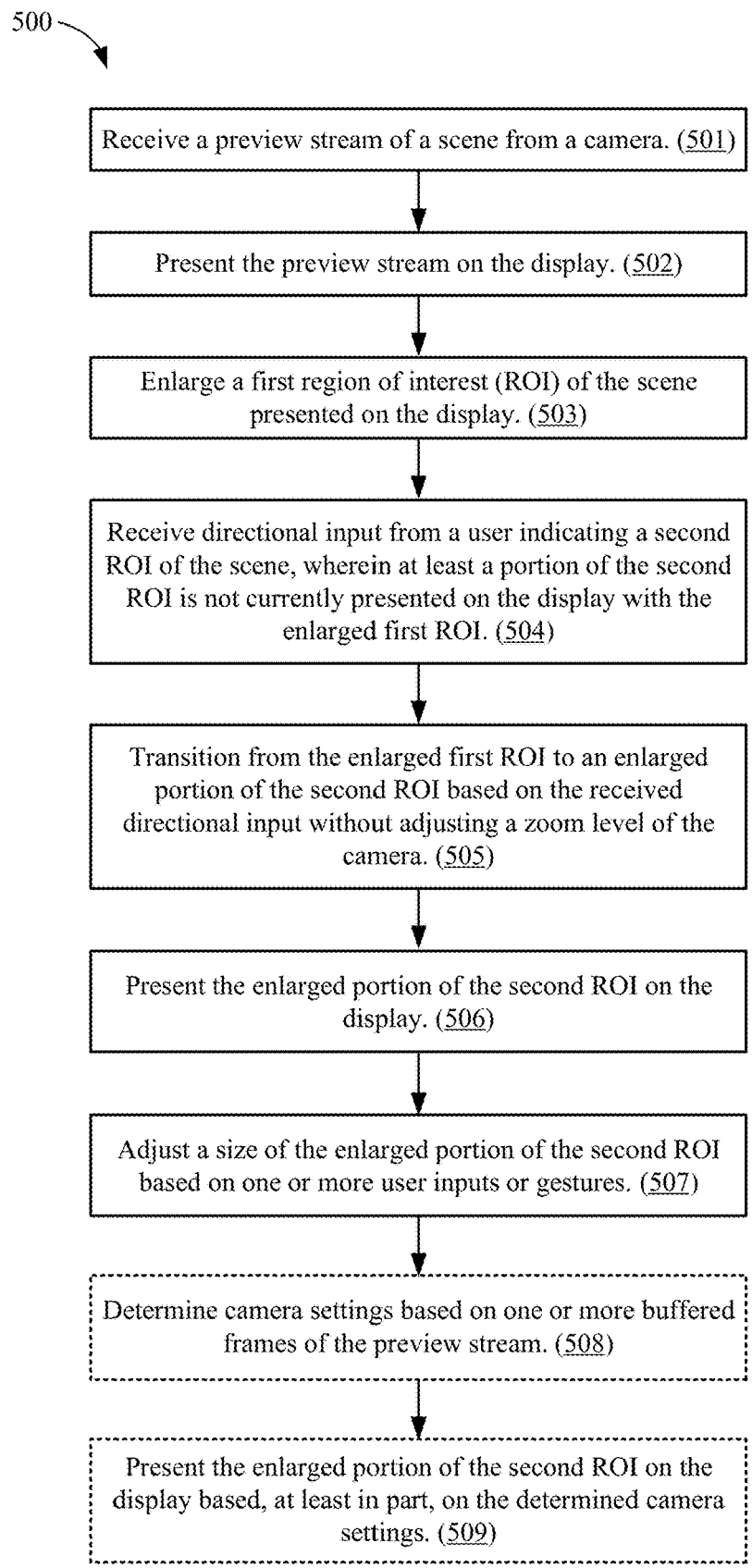
FIG. 5 is an illustrative flow chart depicting an example operation for transitioning from presenting an enlarged first region of interest (ROI) on the display to presenting an enlarged portion of a second ROI on the display.

FIG. 5 is an illustrative flow chart depicting an example operation 500 for transitioning from presenting an enlarged first ROI on the display to presenting an enlarged portion of a second ROI on the display. Although described with respect to the device 100 of FIG. 1, the example operation 500 may be performed by other suitable systems, devices, cameras, or imaging devices. For purposes of discussion herein, the example operation 500 is described with reference to the preview stream 201 and the enlarged regions of interest $220_{UP}$, $220_{DOWN}$, $220_{RIGHT}$, and $220_{LEFT}$ of FIGS. 2A-2B, 3, and 4A-4B. For simplicity, a respective one of the enlarged regions of interest $220_{UP}$, $220_{DOWN}$, $220_{RIGHT}$, and $220_{LEFT}$ may be referred to herein as "the enlarged ROI 220."

The device 100 may receive a preview stream of a scene from a camera (501). In some implementations, the preview stream 201 may be received from the camera 102 of the device. In other implementations, the preview stream 201 may be received from another suitable camera that may not be included within the device 100 (such as a camera positioned remotely from the device 100). The device 100 may present the preview stream of the scene on the display (502). In some implementations, the preview stream 201 may be presented on the display 140 as the full field of view (FOV) of the camera 102.

The device 100 may enlarge a first region of interest (ROI) of the scene presented on the display (503). In some implementations, the device 100 may present only the enlarged first ROI on the display 140 such that the enlarged first ROI occupies a same or similar amount of the display 140 that was previously occupied by the entire preview stream 201, for example, as depicted in FIG. 2B. In some implementations, the device 100 may select the first ROI to be enlarged based on a center point of the camera's FOV (such as the center point 202 of the preview stream 201 presented on the display 140 in FIG. 2A). In other implementations, the user may select the first ROI to be enlarged (rather than relying upon the device 100 to select the ROI to be enlarged based on the center of the camera's FOV).

The device 100 may receive directional input from a user indicating a second ROI of the scene (504). In some implementations, at least a portion of the second ROI may not be currently presented on the display with the enlarged first ROI. For example, if the first enlarged ROI 210' is presented on the display 140 and the device 100 receives directional input indicating the ROI $220_{RIGHT}$ as the second ROI, the device 100 may not present portions of the ROI $220_{RIGHT}$ on the display 140 at the same time that the first ROI 210' is presented on the display 140.

The directional input may be any suitable type of input, signal, command, or gesture that, when provided by the user, may cause or instruct the device 100 to move the enlarged portion of the second ROI around the preview stream 201. In some implementations, the display 140 can be a touch-sensitive display. In some aspects, the directional input may be one of a swiping gesture, a flicking gesture, or a dragging gesture provided on the touch-sensitive display 140. In other aspects, the directional input may be user interaction with one or more directional indicators 301-304 presented on the display 140. In addition, or in the alternative, the display 140 may include or be associated with proximity sensors (such as capacitive sensors) that can detect a user gesture made proximate to, but not necessarily contacting, the display 140. In this manner, the device 100 may receive and interpret user gestures even if the display 140 is not touch-sensitive. In other implementations, the device 100 may include a keypad, one or more physical buttons, and/or other suitable mechanisms to receive inputs and commands from the user.

The device 100 may transition from presenting the enlarged first ROI on the display to presenting an enlarged portion of the second ROI on the display based on the received directional input without adjusting a zoom level of the camera (505). In some implementations, the device 100 may transition from presenting the enlarged first ROI to presenting the enlarged portion of the second ROI on the display based on one or more user inputs including, for example, a swiping input or gesture, a flicking input or gesture, or a dragging input or gesture. In other implementations, the device 100 may transition from presenting the enlarged first ROI to presenting the enlarged portion of the second ROI on the display based on user interaction with one or more directional indicators 301-304 presented on the display 140.

The device 100 may present the enlarged portion of the second ROI on the display (506). In some implementations, the device 100 may present only the enlarged portion of the second ROI on the display 140 such that the enlarged portion of the second ROI occupies a same or similar amount of the display 140 that was previously occupied by the entire preview stream 201.

In addition, or in the alternative, the device 100 may adjust a size of the enlarged portion of the second ROI based on one or more user inputs or gestures (507). In some implementations, the enlarged portion of the second ROI may be contracted based on a pinching gesture, and may be expanded based on a stretching gesture. The pinching and stretching gestures may be performed by the user using two fingers (such as the thumb and index finger) while the fingers remain in contact with the display 140 (which is touch-sensitive to detect the pinching and stretching gestures).

In some implementations, the device 100 may determine camera settings based on one or more buffered frames of the preview stream (508), and may present the enlarged portion of the second ROI on the display based, at least in part, on the determined camera settings (509). In some implementations, the device 100 may buffer one or more frames of the full FOV of the preview stream 201 of the scene, and determine camera settings used to generate the buffered frames. The determined camera settings may be stored in a memory (such as in the camera settings storage 132 of the memory 130) of the device 100. In some aspects, the camera settings may include (but are not limited to) auto white balance (AWB) settings, auto-focus (AF) settings, and auto-exposure (AE) settings used to generate the buffered frames. Because the camera settings stored in the memory 130 of the device 100 were used to generate previous frames of the preview stream of the scene, the device 100 may use the stored camera settings when presenting the enlarged portion of the second ROI on the display 140 without adjusting the zoom level of the camera 102, thereby eliminating the need for the device 100 to determine new camera settings. More specifically, because each of the auto white balance, the auto-focus, and the auto-exposure settings takes time to settle and typically changes very little (if at all) between consecutive frames of the preview stream 201 (assuming that the scene, the FOV, or both has changed very little, if at all), the device 100 may use the previously determined camera settings to present the enlarged portion of the second ROI on the display 140 without resetting the camera settings or determining new camera settings.

Figure 6:
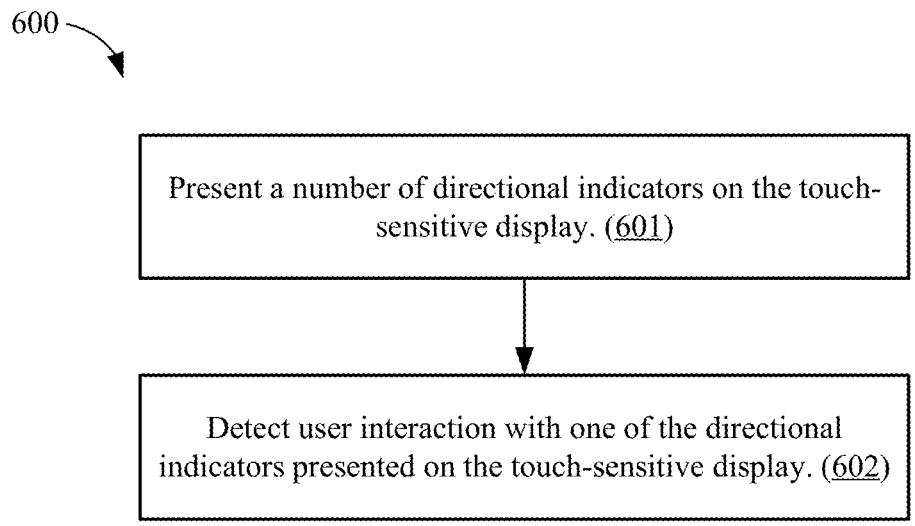
FIG. 6 is an illustrative flow chart depicting an example operation for receiving directional input from a user.

FIG. 6 is an illustrative flow chart depicting an example operation 600 for receiving directional input from a user. The device 100 may present a number of directional indicators on the display (601), and may detect user interaction with one (or more) of the directional indicators presented on the display (602). In some implementations, the display 140 is a touch-sensitive display, and the device 100 may present a number of user-selectable directional indicators 301-304 on the display 140, for example, as depicted in FIG. 3. In some aspects, the device 100 may present a directional indicator 301 that points in an upward direction on the display 140, may present a directional indicator 302 that points in a downward direction on the display 140, may present a directional indicator 303 that points to the right on the display 140, and may present a directional indicator 304 that points to the left on the display 140. In some implementations, the device 100 may "move" the enlarged ROI presented on the display 140 in the upward direction based on user interaction with the directional indicator 301, may "move" the enlarged ROI presented on the display 140 in the downward direction based on user interaction with the directional indicator 302, may "move" the enlarged ROI presented on the display 140 to the right based on user interaction with the directional indicator 303, and may "move" the enlarged ROI presented on the display 140 to the left based on user interaction with the directional indicator 304.

In other implementations, the user may cause the device 100 to "move" the enlarged ROI presented on the display 140 across the preview stream 201 using user inputs or gestures. In some aspects, the user input may be one of a swiping input or gesture, a flicking input or gesture, or a dragging input or gesture. In other aspects, other suitable user input or gestures may cause the device 100 to "move" the enlarged ROI presented on the display 140 across the preview stream 201.

Figure 7:
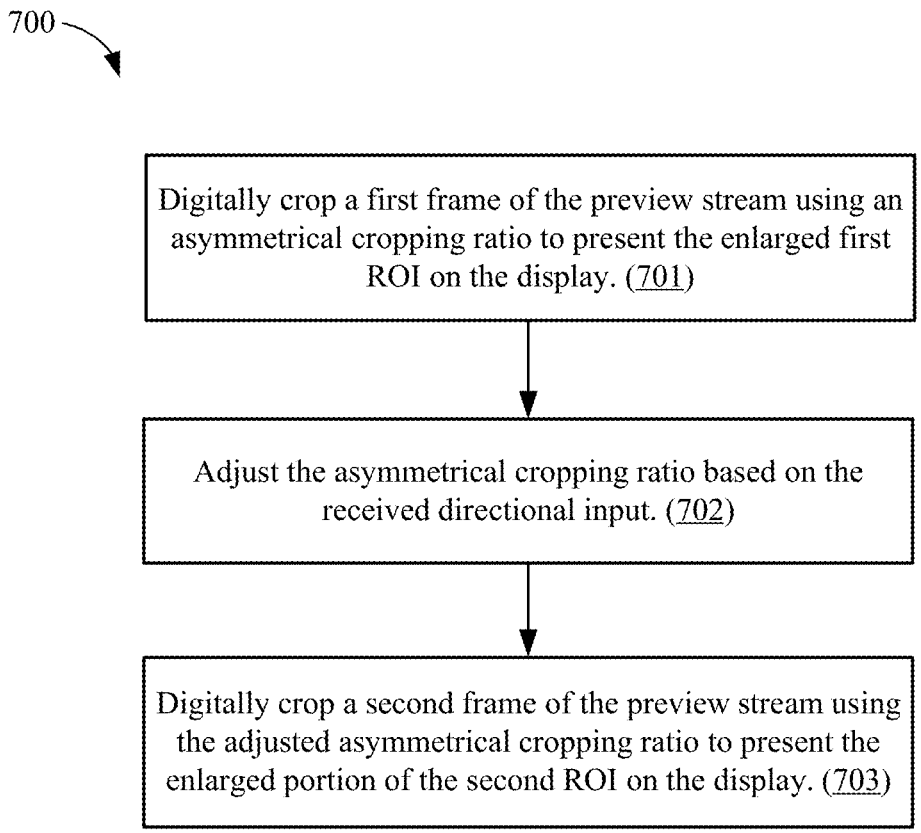
FIG. 7 is an illustrative flow chart depicting an example operation for transitioning from presenting an enlarged first ROI on the display to presenting an enlarged portion of a second ROI on the display based on directional input provided by the user.

FIG. 7 is an illustrative flow chart depicting an example operation 700 for transitioning from presenting an enlarged first ROI on the display to presenting an enlarged portion of a second ROI on the display based on directional input provided by the user. The device 100 may digitally crop a first frame of the preview stream using an asymmetrical cropping ratio to enlarge the first ROI presented on the display (701). In some implementations, the device 100 may adjust the asymmetrical cropping ratio based on the received directional input (702), and may digitally crop a second frame of the preview stream using the adjusted asymmetrical cropping ratio to present the enlarged portion of the second ROI on the display (703). By using an asymmetrical cropping ratio to crop a frame of the preview stream to enlarge a desired ROI (such as rather than using a symmetrical cropping ratio), the device 100 can maintain the aspect ratio of the full FOV of the preview stream.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for operating a system including a display, the method comprising:
    receiving a preview stream of a scene from a camera;
    presenting the preview stream on the display;
    enlarging a first region of interest (ROI) of the scene presented on the display by digitally cropping one or more first frames of the preview stream;
    receiving directional input from a user indicating a second ROI of the scene, wherein at least a portion of the second ROI is not currently presented on the display with the enlarged first ROI;
    transitioning from the enlarged first ROI to an enlarged portion of the second ROI based on the received directional input without adjusting a zoom level of the camera by digitally cropping one or more second frames of the preview stream, wherein the one or more second frames of the preview stream are different than the one or more first frames of the preview stream;

determining camera settings based on one or more buffered frames of the preview stream, wherein the camera settings include one or more of an auto white balance (AWB) setting, an auto-focus (AF) setting, and an auto-exposure (AE) setting; and presenting the enlarged portion of the second ROI on the display based, at least in part, on the camera settings determined based on the one or more buffered frames of the preview stream, wherein the camera settings determined based on the one or more buffered frames are applied to the enlarged portion of the second ROI.

2. The method of claim 1, wherein the enlarged first ROI is presented on the display without adjusting the zoom level of the camera, and the enlarged portion of the second ROI is presented on the display without adjusting the zoom level of the camera.

3. The method of claim 1, wherein the display comprises a touch-sensitive display, and receiving the directional input comprises:

presenting a number of directional indicators on the touch-sensitive display; and detecting user interaction with one of the directional indicators presented on the touch-sensitive display.

4. The method of claim 1, wherein the directional input includes one of a swiping input or gesture, a flicking input or gesture, or a dragging input or gesture.

5. The method of claim 1, wherein the display comprises a touch-sensitive display, the method further comprising:

adjusting a size of the enlarged portion of the second ROI based on one or more user inputs.

6. The method of claim 5, wherein the one or more user inputs includes at least one of a pinching gesture or a stretching gesture.

7. The method of claim 1, wherein enlarging the first ROI comprises:

digitally cropping a first frame of the preview stream using an asymmetrical cropping ratio.

8. The method of claim 7, wherein presenting the enlarged portion of the second ROI on the display comprises:

adjusting the asymmetrical cropping ratio based on the received directional input; and digitally cropping a second frame of the preview stream using the adjusted asymmetrical cropping ratio.

9. The method of claim 1, further comprising:

continuing to receive, after enlarging the first ROI, frames of the preview stream of the scene from the camera, wherein the frames of the preview stream include a full field of view of the scene.

10. A device, comprising:

a display;

one or more processors; and a memory storing instructions that, when executed by the one or more processors, cause the device to:

receive a preview stream of a scene from a camera;

present the preview stream on the display;

enlarge a first region of interest (ROI) of the scene presented on the display by digitally cropping one or more first frames of the preview stream;

receive directional input from a user indicating a second ROI of the scene, wherein at least a portion of the second ROI is not currently presented on the display with the enlarged first ROI;

transition from the enlarged first ROI to an enlarged portion of the second ROI based on the received directional input without adjusting a zoom level of the camera by digitally cropping one or more second frames of the preview stream, wherein the one or more second frames of the preview stream are different than the one or more first frames of the preview stream;

determine camera settings based on one or more buffered frames of the preview stream, wherein the camera settings include one or more of an auto white balance (AWB) setting, an auto-focus (AF) setting, and an auto-exposure (AE) setting; and present the enlarged portion of the second ROI on the display based, at least in part, on the camera settings determined based on the one or more buffered frames of the preview stream, wherein the camera settings determined based on the one or more buffered frames are applied to the enlarged portion of the second ROI.

11. The device of claim 10, wherein the enlarged first ROI is presented on the display without adjusting the zoom level of the camera, and the enlarged portion of the second ROI is presented on the display without adjusting the zoom level of the camera.

12. The device of claim 10, wherein the display comprises a touch-sensitive display, and execution of the instructions to receive the directional input causes the device to:

present a number of directional indicators on the touch-sensitive display; and detect user interaction with one of the directional indicators presented on the touch-sensitive display.

13. The device of claim 10, wherein the directional input includes one of a swiping input or gesture, a flicking input or gesture, or a dragging input or gesture.

14. The device of claim 10, wherein the display comprises a touch-sensitive display, and execution of the instructions further causes the device to:

adjust a size of the enlarged portion of the second ROI based on one or more user inputs.

15. The device of claim 14, wherein the one or more user inputs includes at least one of a pinching gesture or a stretching gesture.

16. The device of claim 10, wherein execution of the instructions to enlarge the first ROI causes the device to:

digitally crop a first frame of the preview stream using an asymmetrical cropping ratio.

17. The device of claim 16, wherein execution of the instructions to present the enlarged portion of the second ROI on the display causes the device to:

adjust the asymmetrical cropping ratio based on the received directional input; and digitally crop a second frame of the preview stream using the adjusted asymmetrical cropping ratio.

18. The device of claim 10, wherein execution of the instructions further causes the device to:

continue to receive, after enlarging the first ROI, frames of the preview stream of the scene from the camera, wherein the frames of the preview stream include a full field of view of the scene.

19. A non-transitory computer-readable medium storing one or more programs containing instructions that, when executed by one or more processors of an apparatus, cause the apparatus to perform operations comprising:

receiving a preview stream of a scene from a camera;

presenting the preview stream on a display of the apparatus;

enlarging a first region of interest (ROI) of the scene presented on the display by digitally cropping one or more first frames of the preview stream;

receiving directional input from a user indicating a second ROI of the scene, wherein at least a portion of the second ROI is not currently presented on the display with the enlarged first ROI;

transitioning from the enlarged first ROI to an enlarged portion of the second ROI based on the received directional input without adjusting a zoom level of the camera by digitally cropping one or more second frames of the preview stream, wherein the one or more second frames of the preview stream are different than the one or more first frames of the preview stream;

determining camera settings based on one or more buffered frames of the preview stream, wherein the camera settings include one or more of an auto white balance (AWB) setting, an auto-focus (AF) setting, and an auto-exposure (AE) setting; and presenting the enlarged portion of the second ROI on the display based, at least in part, on the camera settings determined based on the one or more buffered frames of the preview stream, wherein the camera settings determined based on the one or more buffered frames are applied to the enlarged portion of the second ROI.

20. The non-transitory computer-readable medium of claim 19, wherein the enlarged first ROI is presented on the display without adjusting the zoom level of the camera, and the enlarged portion of the second ROI is presented on the display without adjusting the zoom level of the camera.

21. The non-transitory computer-readable medium of claim 19, wherein the display comprises a touch-sensitive display, and execution of the instructions for receiving the directional input causes the apparatus to perform operations further comprising:

presenting a number of directional indicators on the touch-sensitive display; and detecting user interaction with one of the directional indicators presented on the touch-sensitive display.

22. The non-transitory computer-readable medium of claim 19, wherein the directional input includes one of a swiping input or gesture, a flicking input or gesture, or a dragging input or gesture.

23. The non-transitory computer-readable medium of claim 19, wherein the display comprises a touch-sensitive display, and execution of the instructions causes the apparatus to perform operations further comprising:

adjusting a size of the enlarged portion of the second ROI based on one or more user inputs.

24. The non-transitory computer-readable medium of claim 19, wherein execution of the instructions for enlarging the first ROI causes the apparatus to perform operations further comprising:

digitally cropping a first frame of the preview stream using an asymmetrical cropping ratio.

25. The non-transitory computer-readable medium of claim 24, wherein execution of the instructions for presenting the enlarged portion of the second ROI on the display causes the apparatus to perform operations further comprising:

adjusting the asymmetrical cropping ratio based on the received directional input; and digitally cropping a second frame of the preview stream using the adjusted asymmetrical cropping ratio.

26. An apparatus, comprising:

means for receiving a preview stream of a scene from a camera;

means for presenting the preview stream on a display of the apparatus;

means for enlarging a first region of interest (ROI) of the scene presented on the display by digitally cropping one or more first frames of the preview stream;

means for receiving directional input from a user indicating a second ROI of the scene, wherein at least a portion of the second ROI is not currently presented on the display with the enlarged first ROI;

means for transitioning from the enlarged first ROI to an enlarged portion of the second ROI based on the received directional input without adjusting a zoom level of the camera by digitally cropping one or more second frames of the preview stream, wherein the one or more second frames of the preview stream are different than the one or more first frames of the preview stream;

means for determining camera settings based on one or more buffered frames of the preview stream, wherein the camera settings include one or more of an auto white balance (AWB) setting, an auto-focus (AF) setting, and an auto-exposure (AE) setting; and means for presenting the enlarged portion of the second ROI on the display based, at least in part, on the camera settings determined based on the one or more buffered frames of the preview stream, wherein the camera settings determined based on the one or more buffered frames are applied to the enlarged portion of the second ROI.

* * * * *